United States Patent [19]

King

[11] 4,099,267
[45] Jul. 4, 1978

[54] APPARATUS FOR MIXING GRANULAR FERTILIZER AND/OR LAWN TREATMENT LIQUID IN WATER

[76] Inventor: Woodrow King, 2026 NW. 51 St., Miami, Fla. 33142

[21] Appl. No.: 750,184

[22] Filed: Apr. 4, 1977

[51] Int. Cl.² ............................ B01F 7/22; B01F 15/02
[52] U.S. Cl. .................................... 366/142; 366/168; 366/173; 366/181; 366/182; 366/183
[58] Field of Search ................ 259/7, 8, 23, 24, 43, 259/44, 107, 108, 121, 122; 366/142, 168, 173, 181

[56] References Cited

U.S. PATENT DOCUMENTS

| 506,635 | 10/1893 | Harvey | 259/24 |
|---|---|---|---|
| 661,207 | 11/1900 | Carter | 259/23 |
| 4,021,021 | 5/1977 | Hall | 259/8 |

Primary Examiner—Robert W. Jenkins
Attorney, Agent, or Firm—Oltman and Flynn

[57] ABSTRACT

The present mixing apparatus has a tank for holding water, a hopper at the top for passing granular fertilizer down into the tank, a strainer below this hopper and above a mixing chamber in the tank, a reservoir for liquid insecticide or the like at the top of the tank, a manual valve between this liquid reservoir and the mixing chamber in the tank, a motor-driven rotary shaft carrying upper and lower mixing blades inside the mixing chamber in the tank, and a discharge outlet at the bottom of the tank. The motor is mounted at the top of the tank. An upper sealed bearing for the motor-driven shaft is located in the strainer and a lower sealed bearing for the shaft is located near the bottom of the tank. Inside the tank the mixing chamber is defined by a generally funnel-shaped screen of fine enough porosity to retain the granular fertilizer on the inside of the screen. A spray pipe extends across the inside of the screen near its upper end and down across the outside of the screen at one side.

18 Claims, 5 Drawing Figures

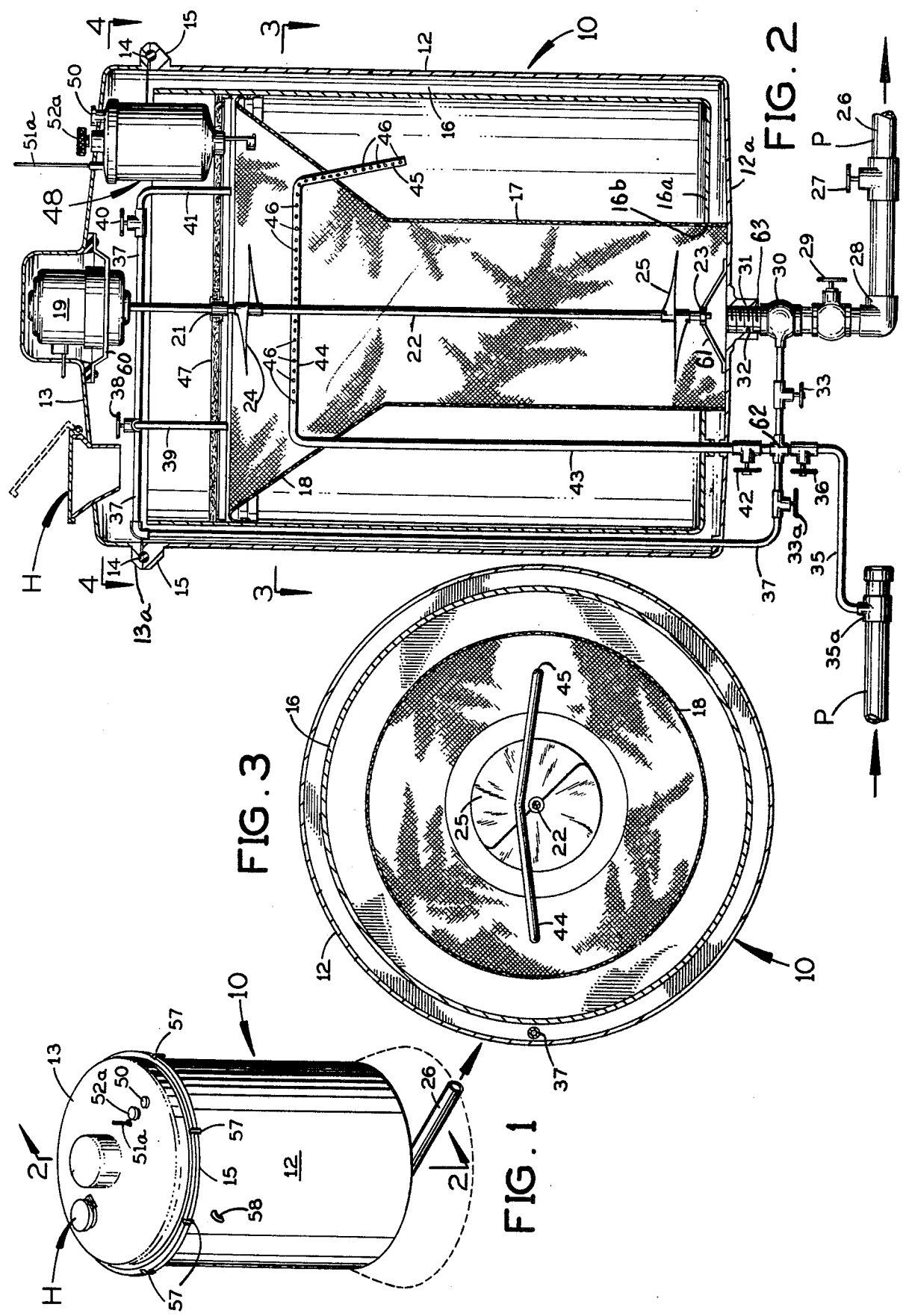

4,099,267

APPARATUS FOR MIXING GRANULAR FERTILIZER AND/OR LAWN TREATMENT LIQUID IN WATER

BACKGROUND OF THE INVENTION

Prior to the present invention there has existed a need for a relatively inexpensive, practical, easily maintained mixing apparatus for use by professional lawn service organizations or farmers for mixing granular fertilizer and/or a treatment liquid, such as insecticide, in water before spraying it onto the ground.

The present invention is directed to a novel mixing apparatus which satisfies this need.

SUMMARY OF THE INVENTION

In accordance with a presently-preferred embodiment of this invention, a novel apparatus is provided for mixing granular fertilizer and/or a liquid insecticide or other treatment liquid in water in an upstanding tank having an outlet at the bottom through which the mixture may pass for spraying onto the ground. The apparatus has a motor-driven vertical shaft with upper and lower mixing blades inside the tank. A screen with a funnel-shaped wide upper end and a smaller cylindrical lower end extends around the shaft from a location near the upper end of the tank down to the bottom of the tank. A porous strainer extends across the top of the tank above the wide funnel mouth of the screen. A hopper at the top of the tank passes granular fertilizer down onto this strainer and all except oversized particles pass down through this strainer into the tank at the inside of the screen. A reservoir for the insecticide or other lawn treatment liquid extends from the top of the tank down to a manual valve, which extends down through the strainer for passing the liquid down into the tank at the inside of the screen. A spray pipe extends across and through the funnel-shaped upper end of the screen for spray-cleaning the screen, when desired. Water supply pipes extend down through the porous strainer for introducing water into the tank at the inside of the screen.

The tank preferably comprises an outer tank and a slightly smaller, concentric inner tank with a bottom opening through which the lower end of the screen extends down to the bottom of the outer tank.

In the preferred embodiment, the motor for the mixer shaft preferably is mounted beneath the top of the tank. The mixer shaft extends through a sealed upper bearing located in the porous strainer, and the upper mixing blades are located just below this strainer. The lower end of the mixer shaft is received in a sealed lower bearing which is supported a short distance above the bottom of the tank. The lower mixing blades are located a short distance above this lower bearing.

A principal object of this invention is to provide a novel and improved apparatus for mixing granular fertilizer and/or a treatment liquid, such as an insecticide, in water before spraying the mixture onto the ground.

Another object of this invention is to provide such an apparatus which is particularly intended for use by commercial lawn service organizations and farmers.

Further objects and advantages of this invention will be apparent from the following detailed description of a presently-preferred embodiment thereof, which is shown in the accompanying drawings in which:

FIG. 1 is a perspective view of the present apparatus;

FIG. 2 is a vertical section taken along the line 2—2 in FIG. 1;

FIG. 3 is a horizontal cross-section taken along the line 3—3 in FIG. 2;

Figure 5:
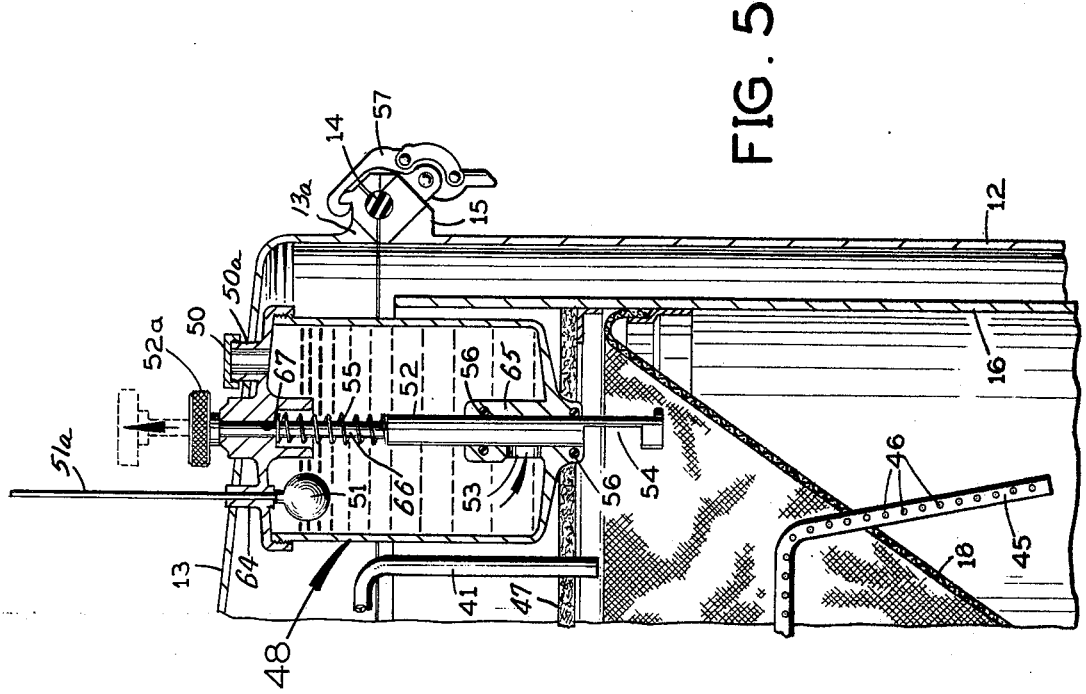
FIG. 5 is a fragmentary vertical section taken along the line 5—5 in FIG. 4 at the upper end of the apparatus.
Figure 4:
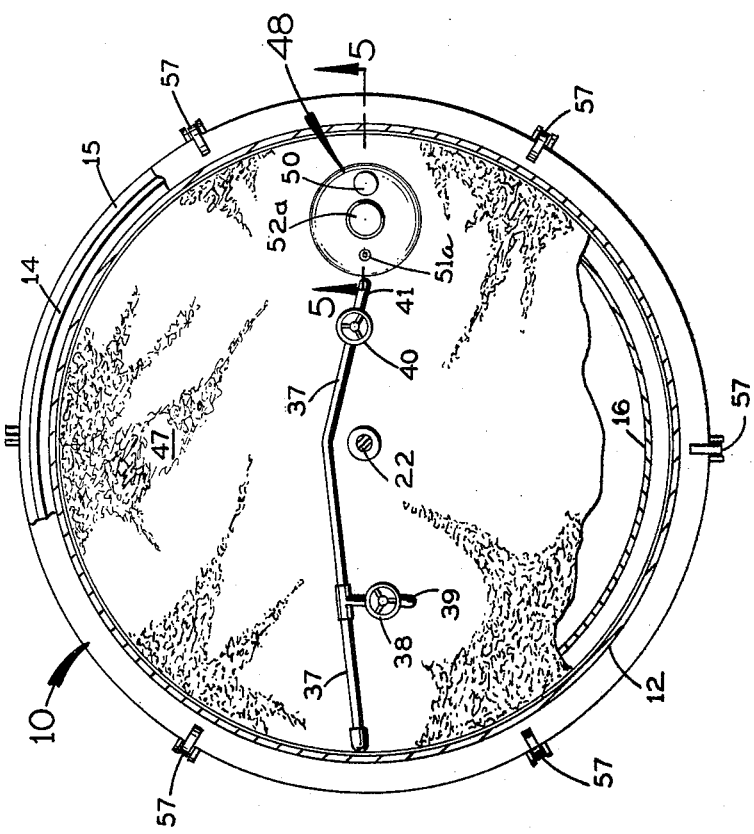
FIG. 4 is a horizontal cross-section taken along the line 4—4 in FIG. 2.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring first to FIG. 2, the present apparatus has a unitary tank assembly 10 including an upstanding cylindrical outer tank 12 and an upstanding inner tank 16 spaced inside the outer tank and concentric with the latter. The inner tank 16 is open at the top and has an annular, flat, horizontal bottom wall 16a extending inward from the lower end of its cylindrical side wall and defining a central opening 16b. The outer tank 12 has a flat, horizontal bottom wall 12a extending inward from the lower end of its cylindrical side wall a short distance below the bottom wall 16a of the inner tank and across the central opening 16b in the latter.

A top cover 13 is releasably attached to the upper end of the outer tank 12. The outer tank has an annular rim 15 at its upper end which presents an upwardly-facing groove of semi-circular cross-section for receiving an O-ring 14 of rubber or rubber-like material. The top cover 13 has a similar annular rim 13a with a downwardly facing groove of semi-circular cross-section for engagement with the O-ring 14 from above. A plurality of clamps 57 (FIG. 5) of known design hold the top cover 13 down on the outer tank 12, with the O-ring 14 providing a fluid-tight seal between them.

Inside the inner tank 16 is located a generally funnel-shaped copper screen having a cylindrical lower end 17 and an upwardly and outwardly flared upper end 18. The lower end 17 of the screen is spaced a substantial distance radially inward from the side wall of the inner tank 16 and extends down snugly through the central opening 16b in the bottom wall 16a of the inner tank 16 into engagement with the bottom wall 12a of the outer tank 12. The flared upper end 18 of the screen is suitably attached at the top to the inside of the cylindrical side wall of the inner tank 16 around the latter's entire extent a short distance below its open upper end.

An electric motor 19 is centrally mounted inside the top cover 13 and it drives a vertical shaft 22, which extends down through the center of the funnel-shaped screen 17, 18. A support bracket 60 for the motor is attached to the underside of the top cover. At about the level of the bottom wall 16a of the inner tank 16, a lower sealed bearing 23 of known design rotatably receives the lower end of the motor-driven shaft 22. This bearing is supported from the bottom wall 12a of the outer tank by a bracket 61. A lower set of mixing blades 25 is affixed to the shaft 22 a short distance above the lower bearing 23. The motor-driven shaft 22 also is engaged by an upper sealed bearing 21, which is mounted in the center of a strainer 47 extending horizontally across the inside of the inner tank 16 immediately above the wide-mouthed upper end 18 of the screen. An upper set of mixing blades 24 is affixed to the shaft 22 immediately below the upper bearing 21.

A hopper H with a hinged top is mounted on the top cover 13 for the tank. This hopper has an open lower end which is spaced above the strainer 47 for discharging granular fertilizer onto the strainer when the top of the hopper is opened and the fertilizer is poured down through it. The fertilizer particles pass down through the strainer 47 into the space bounded by the flared upper end 18 of the screen.

Water is introduced into this same space through depending pipes 39 and 41, which extend down through the strainer 47 as shown in FIG. 2. These water supply pipes are connected through respective manual shutoff valves 38 and 40 to a pipe 37 extending horizontally across the top of the inner tank 16 and down between the side walls of the inner and outer tanks 16 and 12 and out through the bottom wall 12a of the outer tank. Pipe 37 receives water from a supply conduit P via a branch pipe 35, manual shutoff valve 36, fitting 62, and manual shutoff valve 33a.

An annular fitting 31 is mounted in a central opening in the bottom wall 12a of the outer tank. This fitting provides a screw-threaded opening 32 which is coaxial with the motor-driven shaft 22. A screw-threaded coupling 63 is threadedly received in this opening 32 and extends down to a check valve 30 which is connected to an outlet conduit 26 via a manual shutoff valve 29, an elbow 28, and a manual shutoff valve 27.

A manual shutoff valve 33 is connected between the fitting 62 and the body of check valve 30 at the inlet side (i.e., above) the latter's check valve member.

The fitting 62 also has a top outlet which is connected through a manual shutoff valve 42 to a pipe 43 extending up through the bottom walls of the outer and inner tanks at the outside of the cylindrical lower end 17 of the screen. The upper end of pipe 43 extends up through the flared upper end 18 of the screen to a horizontal spray pipe segment 44, which extends across the inside of the flared upper end 18 of the screen about midway of the latter's vertical extent. The opposite end of the horizontal spray pipe segment 44 is joined to a downwardly extending, slightly outwardly inclined spray pipe segment 45, which passes through the flared upper end of the screen at the opposite side of the latter from the vertical pipe 43. The spray pipe 44, 45 has spray openings for discharging water onto the screen and the inside of the inner tank 16.

With this arrangement, water is supplied to pipe 37 when valves 36 and 33a are open, and is supplied to spray pipe 44, 45 when valves 36 and 42 are open. If desired, water may be supplied to the bottom of the outer tank 12 by opening valves 36 and 33 and keeping valves 29 and 27 closed. Liquid may be removed from the bottom of the tank by opening valves 29 and 27, which pass the liquid to the outlet pipe 26 leading to the pump in the spray equipment (not shown).

A reservoir 48 for liquid insecticide or other treatment liquid for the lawn or other crop is attached to the top cover 13 for the outer tank as shown in FIG. 5. This reservoir is generally cylindrical and it presents an upstanding inlet neck 50a which extends up through the top cover 13 and is normally closed by a screw-threaded cap 50. When this cap is removed, the insecticide or other treatment liquid may be poured down into the reservoir 48. The liquid level in the reservoir is indicated by a calibrated stem 51a attached to a float ball 51 inside this reservoir. This stem extends slidably through a guide collar 64 extending up from the top of the reservoir 48 through the top cover 13 for the tank.

The reservoir 48 has a normally-closed discharge valve which may be opened manually to pass the insecticide or other treatment liquid down into the mixing chamber. This valve comprises a vertically displaceable, generally cylindrical valve member 52 which is slidably received in a generally cylindrical boss 65 joined to and extending above and below the bottom wall of the reservoir. The lower end of this boss extends down through an opening in the strainer 47. The boss 65 is formed with an inlet opening 53 on one side which provides fluid communication between the interior of the reservoir 48 at the bottom and the vertical cylindrical bore in the boss.

The valve member 52 is slidably received in this bore. O-rings 56 of rubber or rubber-like material are seated in the boss 65 and sealingly engage the valve member 52 above and below the inlet opening 53. The valve member 52 is formed with a longitudinal recess 54 which provides fluid communication between the inlet opening 53 and the mixing chamber below the strainer 47 when the valve is raised from the normally-closed position shown in full lines in FIG. 5. A valve stem 66 extends up from the valve member 52 and passes slidably through an opening 67 in the top of the reservoir. A knurled knob 52a is attached to the upper end of this valve stem above the top cover 13 for the tank. A coil spring 55 is engaged under compression between the top of the reservoir and the upper end of the valve member 52.

Normally, as shown in full lines in FIG. 5, the spring 55 biases the valve member 52 down to a closed position in which its recess 54 is out of fluid communication with the inlet 53. When the knob 52a is grasped, the valve member 52 may be raised to the position shown in phantom in FIG. 2, in which the upper end of recess 54 in the valve member registers with the inlet 53 and the lower end of recess 54 remains in communication with the mixing chamber below the strainer 47. In this open position of the valve member 52, liquid can flow by gravity from the reservoir 48 down into this mixing chamber.

OPERATION

The tank is filled with water by opening valves 36, 33a, 38 and 40 to supply water to both downwardly extending discharge pipes 39 and 41. Granular fertilizer may be poured down through the hopper H onto the strainer 47. The fertilizer granules flow down through the strainer into the water-filled mixing chamber below. In addition, or alternatively, insecticide or other treatment liquid is introduced into the water-filled mixing chamber by opening the valve 52 as described. The float gauge 51, 51a tells the user how much of this liquid has been introduced before he closes valve 52.

Motor 19 is turned on to start the mixing operation and valve 33a is closed to stop the supply of water to the mixing chamber. With valve 33 closed, valves 29 and 27 may be opened to pass the water mixture of fertilizer and/or insecticide or other treatment liquid from the bottom of the tank to the outlet conduit 26 leading to the spray equipment. The funnel-shaped screen 17, 18 has a porosity small enough to substantially prevent the fertilizer granules from passing through it. From time to time, this screen and the inside of the inner tank 16 may be sprayed with water by opening valves 36 and 42.

I claim:

1. An apparatus for mixing a granular fertilizer and/or a treatment liquid, such as insecticide, with water comprising:
an upstanding tank;
means for introducing water into the tank;
hopper means at the top of said tank for passing granular fertilizer down into the tank;
porous strainer means below said hopper means for straining the granular fertilizer going into the tank, said strainer means extending completely across the interior of the tank near the top;
a rotary motor-driven shaft extending substantially vertically in the tank, mixing blades attached to said shaft in the tank;
a reservoir for the treatment liquid at the top of said tank, said reservoir being located away from said hopper means and extending up from said strainer means;
a manually operated valve for passing the treatment liquid from said reservoir down into the tank, said valve including a vertically displaceable valve member which passes down below said strainer means, spring means biasing said displaceable valve member to a closed position blocking the flow of treatment liquid from said reservoir down into the tank, and a handle on the upper end of said displaceable valve member above said reservoir;
and means providing a fluid outlet at the bottom of the tank.

2. An apparatus according to claim 1, and further comprising a float gauge for indicating visually the liquid level in said reservoir.

3. An apparatus for mixing a granular fertilizer and/or a treatment liquid, such as insecticide, with water comprising:
an upstanding tank;
means for introducing water into the tank;
hopper means at the top of said tank for passing granular fertilizer down into the tank;
porous strainer means below said hopper means for straining the granular fertilizer going into the tank, said strainer means extending completely across the interior of the tank near the top;
a rotary motor-driven shaft extending substantially vertically in the tank, mixing blades attached to said shaft in the tank;
a motor mounted at the top of said tank and driving said rotary shaft;
a first sealed bearing in said strainer means rotatably receiving the shaft;
a second sealed bearing rotatably receiving the shaft near the bottom of the tank;
said mixing blades comprising:
upper blade means attached to the shaft closely below said first bearing and lower blade means attached to the shaft closely above said second bearing;
a reservoir for the treatment liquid at the top of said tank, said reservoir being located away from said hopper means and extending up from said strainer means, a manually operated valve for passing the treatment liquid from said reservoir down into the tank;
and means providing a fluid outlet at the bottom of the tank.

4. An apparatus for mixing a granular fertilizer and/or a treatment liquid, such as insecticide, with water comprising:
an upstanding tank;
means for introducing water into the tank;
hopper means at the top of said tank for passing granular fertilizer down into the tank;
porous strainer means below said hopper means for straining the granular fertilizer going into the tank, said strainer means extending completely across the interior of the tank near the top;
a rotary motor-driven shaft extending substantially vertically in the tank, mixing blades attached to said shaft in the tank;
a reservoir for the treatment liquid at the top of said tank, said reservoir being located away from said hopper means and extending up from said strainer means, a manually operated valve for passing the treatment liquid from said reservoir down into the tank;
means providing a fluid outlet at the bottom of the tank; and
a generally funnel-shaped screen positioned inside said tank and extending around said shaft and said mixing blades, said screen having a wide upper end which is sealed to the inside of the tank immediately below said strainer means and having a narrower lower end extending around said outlet at the bottom of the tank, said screen having a fine enough porosity to retain the granular fertilizer on the inside.

5. An apparatus according to claim 4, and further comprising:
a spray pipe extending across the inside of said funnel-shaped screen toward the latter's wide upper end and having a plurality of spray openings;
and valve means for selectively passing water to said spray pipe to spray the screen.

6. An apparatus for mixing a granular fertilizer and/or a treatment liquid, such as insecticide, with water comprising:
an upstanding tank;
means for introducing water into the tank;
hopper means at the top of said tank for passing granular fertilizer down into the tank;
porous strainer means below said hopper means for straining the granular fertilizer going into the tank;
a rotary motor-driven shaft extending substantially vertically in the tank, mixing blades attached to said shaft in the tank;
a reservoir for the treatment liquid at the top of said tank, a manually operated valve for passing the treatment liquid from said reservoir down into the tank;
means providing a fluid outlet at the bottom of the tank; and
selectively operable means for spraying the inside of the tank.

7. An apparatus for mixing granular fertilizer and/or a treatment liquid, such as insecticide, with water comprising:
an upstanding outer tank having a top cover;
an upstanding inner tank which is open at the top and is spaced inside said outer tank;
a porous strainer extending across the inside of said inner tank near its upper end;
a hopper on said top cover of the outer tank above said strainer for passing granular fertilizer down through said strainer into the inner tank;
a reservoir for the treatment liquid located between said top cover of the outer tank and said strainer, means providing an inlet opening for said reservoir above said top cover of the outer tank for introducing the treatment liquid down into said reservoir, and a manually-operated outlet valve at the bottom of said reservoir passing down through said strainer for discharging the treatment liquid from the reservoir down into the inner tank;

an electric motor mounted on said top cover of the outer tank;

a rotary shaft coupled to said motor to be driven thereby and extending down through said strainer into the inner tank, mixer blades attached to said shaft inside the inner tank;

a water supply pipe extending from below said tanks up between the outer and inner tanks and across the top of said strainer and below said top cover of the outer tank, said pipe having outlets extending down through said strainer for discharging water down into the inner tank;

a spray pipe extending from below the tanks up into the inner tank and having spray openings inside the inner tank below said strainer;

valve means for selectively controlling the supply of water to said water supply pipe and said spray pipe;

and means defining an outlet opening at the bottom of the outer tank which is in fluid communication with the interior of the inner tank at the bottom of the latter.

8. An apparatus according to claim 7, and further comprising:
an upper sealed bearing supported by said strainer and rotatably receiving said shaft;
a lower sealed bearing rotatably receiving said shaft at the latter's lower end;
and a support for said lower bearing mounted on the bottom of the outer tank.

9. An apparatus according to claim 7, wherein said blades comprise upper and lower blade means spaced apart vertically along said shaft.

10. An apparatus according to claim 9, wherein said upper blade means is mounted on the shaft immediately below said strainer, and said lower blade means is mounted on said shaft near the bottom of the inner tank.

11. An apparatus according to claim 7, wherein said outlet valve includes a vertically displaceable valve member at the bottom of the reservoir which extends down through the strainer, a valve stem connected to said valve member and extending up through said top cover of the outer tank, and spring means biasing said valve member to a closed position blocking the flow of the treatment liquid from the reservoir down into the inner tank.

12. An apparatus according to claim 7, and further comprising a float member inside the reservoir, and a stem extending up from said float member beyond said top cover of the outer tank and calibrated to indicate the level of the treatment liquid in the reservoir.

13. An apparatus according to claim 7, and further comprising a generally funnel-shaped screen positioned inside said inner tank and extending around said shaft and said mixing blades, said screen having a wide upper end which is sealed to the inside of the inner tank immediately below said strainer means and having a narrower lower end extending around said outlet at the bottom of the outer tank, said screen having a porosity effective to retain the granular fertilizer inside the screen as it flows down to said outlet.

14. An apparatus according to claim 13, wherein said spray pipe extends across the inside of said funnel-shaped screen toward the latter's upper end and has a plurality of spray openings inside said screen.

15. An apparatus according to claim 14, wherein said spray pipe also extends down inside the inner tank at the outside of the screen and has spray openings thereat.

16. An apparatus according to claim 13, and further comprising:
an upper sealed bearing rotatably receiving said motor-driven shaft near its upper end;
and a lower sealed bearing rotatably receiving said motor-driven shaft at its lower end.

17. An apparatus according to claim 16, wherein said mixer blades include:
upper blade means attached to said shaft closely below said upper bearing;
and lower blade means attached to said shaft closely above said lower bearing.

18. An apparatus according to claim 17, wherein said manually-operated outlet valve for the reservoir includes:
a vertically displaceable valve member which extends down below said strainer;
spring means biasing said valve member to a closed position blocking the flow of treatment liquid from said reservoir down into said inner tank;
and a handle on the upper end of said valve member above said top cover of the outer tank.

* * * * *